United States Patent [19]

Odell et al.

[11] Patent Number: 5,080,987
[45] Date of Patent: Jan. 14, 1992

[54] PHOTOCONDUCTIVE IMAGING MEMBERS WITH POLYCARBONATE BINDERS

[75] Inventors: Peter G. Odell; Dasarao K. Murti; Charles G. Allen, all of Mississauga, Canada

[73] Assignee: Xerox Corporation, Stamford, Conn.

[21] Appl. No.: 546,821

[22] Filed: Jul. 2, 1990

[51] Int. Cl.$^5$ .............................................. G03G 5/10
[52] U.S. Cl. ...................................... 430/48; 430/58; 430/59
[58] Field of Search .................... 430/58, 59, 96, 48

[56] References Cited

U.S. PATENT DOCUMENTS

| | | | |
|---|---|---|---|
| 4,260,671 | 4/1981 | Merrill | 430/67 |
| 4,265,990 | 5/1981 | Stolka et al. | 430/59 |
| 4,345,062 | 8/1982 | Brunelle | 528/198 |
| 4,508,803 | 4/1985 | Law et al. | 430/59 |
| 4,657,993 | 4/1987 | Lora et al. | 525/538 |
| 4,772,526 | 9/1988 | Kan et al. | 430/58 |
| 4,869,988 | 9/1989 | Ong et al. | 430/59 |
| 4,921,940 | 5/1990 | Odell et al. | 528/486 |
| 4,956,256 | 9/1990 | Ohtsuka et al. | 430/96 |

*Primary Examiner*—John Goodrow
*Attorney, Agent, or Firm*—E. O. Palazzo

[57] ABSTRACT

Block copolymers of the formula

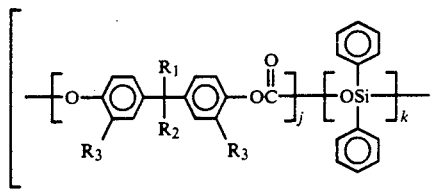

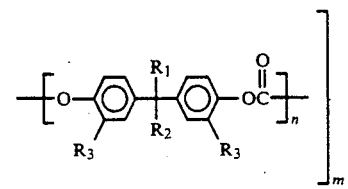

wherein $R_1$, $R_2$, and $R_3$ are independently selected from the group consisting of hydrogen, alkyl and aryl; k, j, m and n represent the number of repeating segments, and imaging members thereof.

22 Claims, 1 Drawing Sheet

PHOTOCONDUCTIVE IMAGING MEMBERS WITH POLYCARBONATE BINDERS

BACKGROUND OF THE INVENTION

This invention is generally directed to photoconductive imaging members, and more specifically to imaging members with polycarbonate binders. The present invention in one embodiment is directed to layered imaging members comprised of charge transport layers with charge transport molecules dispersed in polycarbonate binder, which novel polycarbonates contain telechelic polysiloxane macromers. In a specific embodiment, the present invention relates to layered imaging members comprised of a photogenerating layer and a hole transport layer wherein the transport molecules thereof are dispersed in a polycarbonate resinous binder, which polycarbonates have incorporated therein polysiloxane telomers during, for example, a polyesterification reaction. Further, in another embodiment of the present invention the imaging member is comprised of a supporting substrate, a photogenerating layer, and in contact therewith a charge, especially a hole transport layer comprised of hole transport molecules dispersed in the aforementioned polycarbonate resinous binder. The charge transport layer can be located as the top layer of the imaging member, or alternatively it may be situated between a supporting substrate and the photogenerating layer. The aforementioned polycarbonate binders can possess a number of advantages including, for example, resistance to abrasion, increased tensile toughness of up to fifty fold times more relative to polycarbonate Z, from about 2 Joules/cm$^3$ to about 100 Joules/cm$^3$, increased elongation to break of five to ten times more relative to polycarbonate Z, the solubility thereof in a number of solvents such as aromatic solvents including toluene, tetrahydrofuran, xylene, and benzene, and aliphatic solvents such as halogenated hydrocarbons thus permitting, for example, and improved coatability thereof with organic charge transport components utilizing various known processes such as spray, dip, and draw-down coating. Another advantage associated with many of the imaging members of the present invention resides in the ability to modify the substituents, or side groups present on the polycarbonates thereby providing, for example, substantial latitude in improving the mechanical and surface properties of the charge transport layers including, for example, environmental stability, abrasion resistence, elimination of a protective top coating, and/or excellent paper stripping characteristics for the imaging member.

The tensile toughness represents the area of a stress strain curve when a sample of the material is strained to its breaking point, this phrase being well known in the art, and moreover there can be selected a known tensile test for films and coatings of the polycarbonate binders, which tests are capable of enabling the calculation of the Young's modulus, tensile strength, yield strength, percent elongation, and tensile toughness.

The novel polycarbonates binders illustrated herein may also be selected in an embodiment of the present invention as a resin binder for the charge generating layer, particularily since it is believed that such a binder may enable improved photogenerating pigment dispersion stability, and increased photosensitivity for the resulting imaging member.

The imaging members of the present can be selected for a number of imaging and printing processes including electrophotographic imaging and printing processes for an extended number of imaging cycles, exceeding 200,000, for example, while substantially avoiding or minimizing abrasion thereof. Also, the imaging members of the present invention can be selected for a number of color imaging and printing processes.

The formation and development of electrostatic latent images on the imaging surfaces of photoconductive materials by electrostatic means is well known. Numerous different photoconductive members for use in xerography are known such as selenium, alloys of selenium, layered imaging members comprised of aryl amine charge transport layers, reference U.S. Pat. No. 4,265,990, and imaging members with charge transport layers comprised of polysilylenes, reference U.S. Pat. No. 4,618,551. The disclosures of the aforementioned patents are totally incorporated herein by reference. With the aforementioned imaging members, especially those of the '990 patent, there are selected aryl amine charge transport layers, which aryl amines are soluble in halogenated hydrocarbons such as methylene chloride. Further, the polycarbonates of the present invention can also be selected as resinous binders for imaging members with electron transport layers, reference U.S. Pat. No. 4,474,865, the disclosure of which is totally incorporated herein by reference.

In U.S. Pat. No. 4,869,988 and U.S. Pat. No. 4,946,754, the disclosures of which are totally incorporated herein by reference, there are described layered photoconductive imaging members with transport layers incorporating, for example, biarylyl diarylamines, N,N-bis(biarylyl)anilines, and tris(biarylyl)amines as charge transport compounds. In the above-mentioned patents, there are disclosed improved layered photoconductive imaging members comprised of a supporting substrate, a photogenerating layer optionally dispersed in an inactive resinous binder, and in contact therewith a charge transport layer comprised of the above-mentioned charge transport compounds, or mixtures thereof dispersed in resinous binders.

Examples of specific hole transporting components disclosed in U.S. Pat. No. 4,869,988 include N,N-bis(4-biphenylyl)-3,5-dimethoxyaniline (Ia); N,N-bis(4-biphenylyl)-3,5-dimethylaniline (Ib); N,N-bis(4-methyl-4'-biphenylyl)-3-methoxyaniline (Ic); N,N-bis(4-methyl-4'-biphenylyl)-3-chloroaniline (Id); N,N-bis(4-methyl-4'-biphenylyl)-4-ethylaniline (Ie); N,N-bis(4-chloro-4'-biphenylyl)-3-methylaniline (If); N,N-bis(4-bromo-4'-biphenylyl)-3,5-dimethoxy aniline (Ig); 4-biphenylyl bis(4-ethoxycarbonyl-4'-biphenylyl)amine (IIa); 4-biphenylyl bis(4-acetoxymethyl-4'-biphenylyl)amine (IIb); 3-biphenylyl bis(4-methyl-4'-biphenylyl)amine (IIc); 4-ethoxycarbonyl-4'-biphenylyl bis(4-methyl-4'-biphenylyl)amine (IId); and the like.

Examples of specific hole transporting compounds disclosed in U.S. Pat. No. 4,946,754 include bis(p-tolyl)-4-biphenylylamine (IIa); bis(p-chlorophenyl)-4-biphenylylamine (IIb); N-phenyl-N-(4-biphenylyl)-p-toluidine (IIc); N-(4-biphenylyl)-N-(p-chlorophenyl)-p-toluidine (IId); N-phenyl-N-(4-biphenylyl)-p-anisidine (IIe); bis(m-anisyl)-4-biphenylylamine (IIIa); bis(m-tolyl)-4-biphenylylamine (IIIb); bis(m-chlorophenyl)-4-biphenylylamine (IIIc); N-phenyl-N-(4-biphenylyl)-m-toluidine (IIId); N-phenyl-N-(4-bromo-4'-biphenylyl)-m-toluidine (IVa); diphenyl-4-methyl-4'-biphenylylamine (IVb); N-phenyl-N-(4-ethoxycarbonyl-4'- biphenylyl)-m-toluidine (IVc); N-phenyl-N-(4-methoxy-4'-biphenylyl)-m-toluidine (IVd); N-(m-anisyl)-N-(4-biphenylyl)-p-toluidine (IVe); bis(m-anisyl)-3-biphenylylamine (Va); N-phenyl-N-(4-methyl-3'-biphenylyl)-p-toluidine (Vb); N-phenyl-N-(4-methyl-3'-biphenylyl)-m-anisidine (Vc); bis(m-anisyl)-3-biphenylylamine (Vd); bis(p-tolyl)-4-methyl-3'-biphenylylamine (Ve); N-p-tolyl-N-(4-methoxy-3'-biphenylyl)-m-chloroaniline (Vf), and the like. The aforementioned charge, especially hole transport components, can be selected for the imaging members of the present invention in embodiments thereof.

It is also indicated in the aforementioned patents that there may be selected as resin binders for the charge transport molecules those components as illustrated in U.S. Pat. No. 3,121,006 including polycarbonates, polyesters, epoxy resins, polyvinylcarbazole; and also wherein for the preparation of the charge transport layer with a polycarbonate there is selected methylene chloride as a solvent.

There is also mentioned as prior art U.S. Pat. Nos. 4,657,993, the disclosure of which is totally incorporated herein by reference, directed to polyphosphazene homopolymers and copolymers of the formula as recited, for example, in the Abstract of the Disclosure, which components may be selected as photoconductive materials and for other uses, see column 1, and continuing on to column 2; and as background interest directed to processes for the preparation of phosphonitrilic polymer mixtures, reference the Abstract of the Disclosure; 3,515,688 related to phosphonitrile elastomers, reference for example the Abstract of the Disclosure; 3,702,833 directed to curable fluorophosphazene polymers, see for example column 1; and 3,856,712 directed to polyphosphazene copolymers which are elastomers. The disclosures of each of the aforementioned patents are totally incorporated herein by reference.

While imaging members with various charge transporting substances, especially hole transports, including the aryl amines disclosed in the prior art, are suitable for their intended purposes, there continues to be a need for improved imaging members, particularly layered members, with abrasion resistant resin binders. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members comprised of hole transport layers wherein the problems of transport molecule crystallization, bleeding and leaching are avoided or minimized. Furthermore, there is a need for imaging members with charge transport compounds or polymers dispersed in certain polycarbonate resin binders that are soluble in nontoxic solvents, and wherein the resulting imaging members are inert to the users thereof. A further need resides in the provision of photoconductive imaging members with desirable mechanical characteristics.

SUMMARY OF THE INVENTION

It is therefore a feature of the present invention to provide layered photoresponsive imaging members with many of the advantages indicated herein.

Also, it is a feature of the present invention to provide binders for charge transport molecules contained in layered photoconductive imaging members.

It is yet another feature of the present invention to provide layered photoresponsive imaging members with charge, especially hole transport layers in contact with a photogenerating layer, which members are suitable for use with liquid and dry developers.

In a further feature of the present invention there is provided a layered photoresponsive imaging member with a photogenerating layer situated between a supporting substrate, and a hole transport layer with a polycarbonate resin binder.

In yet another feature of the present invention there is provided a photoresponsive imaging member comprised of a hole transporting layer situated between a supporting substrate and a photogenerating layer.

In another feature of the present invention there are provided imaging and printing methods with the layered imaging members disclosed herein.

Another feature of the present invention resides in the provision of novel polycarbonates and processes thereof.

A further feature of the present invention is to provide improved layered imaging members wherein the problems of transport molecule crystallization, hole charge transport molecule, bleeding and leaching, and the like are eliminated or minimized enabling their selection, for example, in imaging apparatuses with liquid developer compositions and which members are insensitive to changes in environmental conditions.

Further, in another feature of the present invention there are provided imaging members with charge, especially hole, transport layers that can be fabricated from solvents other than halogenated materials such as methylene chloride.

Also, in another feature of the present invention there are provided imaging members with charge transport layers that are free or substantially free of charge trapping.

Another feature of the present invention resides in the provision of imaging members with electrical stability for an extended number of imaging cycles, for example exceeding 200,000 in some instances.

Moreover, in another feature of the present invention there are provided charge transport layers for imaging members, which layers can be prepared with nontoxic solvents.

Furthermore, in another feature of the present invention there are provided polycarbonates with increased tensile strength, tensile toughness and improved elongation to break.

Another feature of the present invention resides in the provision of imaging members wherein the polycarbonates illustrated herein can be selected as a resin binder for the photogenerating pigments.

Another feature of the present invention resides in the provision of copolycarbonates which can be selected as resin binders, which copolycarbonates are obtained from the reaction, for example, of a bisphenol and a difunctional phenylsilanol.

These and other features of the present invention can be accomplished in embodiments thereof by the provision of layered imaging members comprised, for example, of a photogenerating layer and a charge transport layer. More specifically, the present invention is directed to layered imaging members comprised of photogenerating layers, and in contact therewith hole transport layers comprised of, for example, hole transporting aryl amines, the amines of U.S. Pat. No. 4,299,897, the disclosure of which is totally incorporated herein by reference, and the like dispersed in a polycarbonate resin binder, which polycarbonate is comprised of block copolycarbonates of bisphenols and polydiphenylsiloxane.

In one embodiment, the present invention is directed to a layered photoconductive imaging member comprised of a supporting substrate, a photogenerating layer comprised of organic or inorganic photoconductive pigments optionally dispersed in an inactive resinous binder, and in contact therewith a hole transport layer comprised of the aryl amines as illustrated in U.S. Pat. No. 4,265,990, the disclosure of which is totally incorporated herein by reference, and the aforementioned '897 patent, which amines are dispersed in a polycarbonate resin binder of the formula:

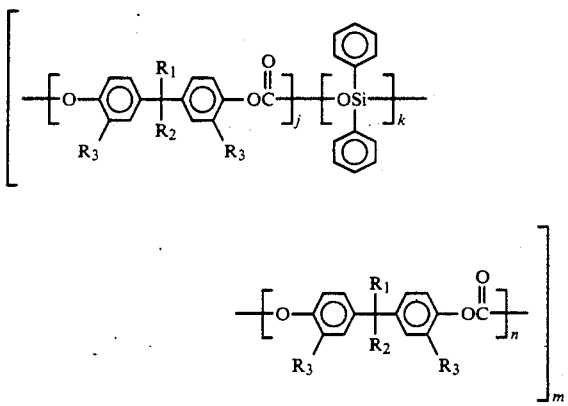

wherein k corresponds to the degree of polymerization and, for example, is a number of from about 4 to about 12; j and n correspond to the degree of polymerization and are, for example, numbers of from about 4 to about 200; $R_1$ and $R_2$ are independently selected from the group consisting of hydrogen, alkyl, substituted alkyl, aryl, substituted aryl, and the like, wherein alkyl can be substituted with, for example, halogen such as fluoro, chloro and bromo, and aryl can contain substituents such as alkyl including methyl, ethyl, propyl, butyl, pentyl, hexyl, heptyl, octyl, nonyl, decyl, and the like; $R_3$ is alkyl, such as methyl, hydrogen or halogen such as chlorine or bromine; and m represents the number of repeating segments. Alkyl can be branched, for example, with alkyl groups or contain aryl substituents; and the $R_1$-C-$R_2$ can be a sulfonyl group, a carbonyl, oxygen, and the like; and this central substituent need not be 1,4 or para to the oxygen but could be 1,3 or meta to the oxygen. Alkyl contains, for example, from 1 to about 25 carbon atoms, and aryl contains, for example, from 6 to about 24 carbon atoms, such as methyl, ethyl, and the like, phenyl, benzyl, napthyl, cyclohexyl, t-butylcyclohexyl, phenylcyclohexyl, cycloheptyl and the like; $R_1$-C-$R_2$ can also be replaced by groups such as 1,2-phenylenebisisopropylidene or 1,4-phenylenebisisopropylidene. The aforementioned polymer in embodiments of the present invention possesses a number average molecular weight of from about 7,000 to about 100,000, and a weight average molecular weight of from about 15,000 to about 300,000, and a $M_w/M_n$ ratio of from about 2.0 to about 4.0 as determined by a Waters Gel Permeation Chromatograph employing four Ultrastyragel ® columns with pore sizes of 100, 500, 500, and 104 Angstroms and using THF (tetrahydrofuran) as a solvent. It is believed that up to some maximum molecular weight polymer mechanical properties improve with increasing molecular weight. However, it is also believed that the coating technique chosen for photoreceptor fabrication can determine the choice of molecular weight since with spray coating usually lower molecular weight polymer is selected as compared to dip coating wherein a lower molecular weight is selected as compared to drawn film coating.

The polycarbonates of the present invention are named herein according to the conventions of the International Union of Pure and Applied Chemistry as found in Source-Based Nomenclature for Copolymers, *Pure & Appl. Chem.*, Vol. 57, No. 10, pages 1427 to 1440, 1985, the disclosure of which is totally incorporated herein by reference. Specifically, block polymers of the present invention include, for example, poly(4,4'-(1-phenylethylidene)bisphenol)carbonate with 10 weight percent of polydiphenylsiloxane blocks which can named according to the above conventions as poly(poly(4,4'-(1phenylethylidene)bisphenol)carbonate-block-polydiphenylsiloxane-block-poly(4,4'-(1-phenylethylidene)-bisphenol)carbonate) (a:10:c mass percent) the polymer contains 10 percent by weight polysiloxane. Examples of polycarbonates of the present invention include poly(poly(4,4'-(1-phenylethylidene)bisphenol)carbonate-block-polydiphenylsiloxane-block-poly(4,4'-(1-phenylethylidene)bisphenol)carbonate) (a:5:c mass percent), poly(poly(4,4'-(1-phenylethylidene)bisphenol)-carbonate-block-polydiphenylsiloxane-block-poly(4,4'-(1-phenylethylidene)bisphenol)carbonate) (a:15:c mass percent), poly(poly(4,4'-(1-phenylethylidene)bisphenol)carbonate-block-polydiphenylsiloxane-block-poly(4,4'-(1-phenylethylidene)bisphenol)carbonate) (a:20:c mass percent), poly(poly(4,4'-cyclohexylidenebisphenol)carbonate-block-polydiphenylsiloxane-block-poly(4,4'-cyclohexylidenebisphenol)carbonate), poly(poly(4,4'-cyclohexylidene-2,2'-dimethylbisphenol)carbonate-block-polydiphenylsiloxane-block-poly(4,4'-cyclohexylidene-2,2'-dimethylbisphenol)carbonate), poly(poly(4,4'-(1,4-phenylenebisisopropylidene)bisphenol)carbonate-block-polydiphenylsiloxane-block-poly(4,4'-(1,4-phenylenebisisopropylidene)bisphenol)carbonate), poly(poly(4,4'-isopropylidenebisphenol)carbonate-block-polydiphenylsiloxane-block-poly(4,4'-isopropylidenebisphenol)carbonate), poly(poly(4,4'-cycloheptylidenebisphenol)carbonate-block-polydiphenylsiloxane-block-poly(4,4'-cycloheptylidenebisphenol)carbonate), poly(poly(4,4'-diphenylmethylidenebisphenol)carbonate-block-polydiphenylsiloxane-block-poly(4,4'-diphenylmethylidenebisphenol)carbonate), poly(poly(4,4'-(1-naphthylethylidene)bisphenol)carbonate-block-polydiphenylsiloxane-block-poly(4,4'-(1-napthylethylidene)-bisphenol)carbonate), poly(poly(4,4'-(1,2-phenylenebisisopropylidene)bisphenol)carbonate-block-polydiphenylsiloxane-block-poly(4,4'-(1,2-phenylenebisisopropylidene)bisphenol)carbonate), poly(poly(4,4'-(4-t-butylcyclohexylidene)bisphenol)-carbonate-block-polydiphenylsiloxane-block-poly(4,4'-(4-t-butylcyclohexylidene)bisphenol)carbonate), poly(-poly(4,4'-(1,2-diphenylethylidene)bisphenol)carbonate-block-polydiphenylsiloxane-block-poly(4,4'-(1,2-diphenylethylidene)bisphenol)carbonate), poly(-poly(4,4'-(1,3-diphenylisopropylidene)bisphenol)carbonate-block-polydiphenylsiloxane-block-poly(4,4'-(1,3-diphenylisopropylidene)bisphenol)carbonate), poly(poly(4,4'-(4-phenylcyclohexylidene)bisphenol)- carbonate-block-polydiphenylsiloxane-block-poly(4,4'-(4-phenylcyclohexylidene)bisphenol)carbonate), poly(poly(4,4'-cyclohexylidene-2,2'-dichlorobisphenol)carbonate-block-polydiphenylsiloxane-block-poly(4,4'-cyclohexylidene-2,2'-dichlorobisphenol)carbonate), poly(poly(4,4'-cyclohexylidene-2,2'-dibromobisphenol)carbonate-block-polydiphenylsiloxane-block-poly(4,4'-cyclohexylidene-2,2'-dibromobisphenol)carbonate), poly(poly(4,4'-isopropylidene-2,2'-dichlorobisphenol)carbonate-block-polydiphenylsiloxane-block-poly(4,4'-isopropylidene-2,2'-dichlorobisphenol)carbonate), poly(poly(4,4'-(1-phenylethylidene)-2,2'-dibromobisphenol)carbonate-block-polydiphenylsiloxane-block-poly(4,4'-(1-phenylethylidene)-2,2'-dibromobisphenol)carbonate), poly(poly(4,4'-sulfonyldiphenol)carbonate-block-polydiphenylsiloxane-block-poly(4,4'-sulfonyldiphenol)carbonate), and the like. Other examples include block copolymers of different polysiloxane structures such as poly(poly(4,4'-(1-phenylethylidene)bisphenol)carbonate-block-poly(diphenylsiloxane-co-dimethylsiloxane)-block-poly(4,4'-(1-phenylethylidene)bisphenol)carbonate), poly(poly(4,4'-isopropylidene)bisphenol)carbonate-block-poly(diphenylsiloxane-co-dimethylsiloxane)-block-poly(4,4'-isopropylidene)bisphenol)carbonate), poly(poly(4,4'-diphenylmethylidenebisphenol)carbonate-block-poly(diphenylsiloxane-co-dimethylsiloxane)-block-poly(4,4'-diphenylmethylidenebisphenol)carbonate), poly(poly(4,4'-cyclohexylidenebisphenol)carbonate-block-poly(diphenylsiloxane-co-dimethylsiloxane)-block-poly(4,4'-cyclohexylidenebisphenol)carbonate), poly(poly(4,4'-(1-phenylethylidene)bisphenol)carbonate-block-polydimethylsiloxane-block-poly(4,4'-(1-phenylethylidene)bisphenol)carbonate), poly(poly(4,4'-isopropylidene)bisphenol)carbonate-block-polymethylsiloxane-block-poly(4,4'-isopropylidene)bisphenol)carbonate), poly(poly(4,4'-diphenylmethylidenebisphenol)carbonate-block-polymethylsiloxane-block-poly(4,4'-diphenylmethylidenebisphenol)carbonate), poly(poly(4,4'-cyclohexylidenebisphenol)carbonate-block-polydimethylsiloxane-block-poly(4,4'-cyclohexylidenebisphenol)carbonate), poly(poly(4,4'-(1-phenylethylidene)bisphenol)carbonate-block-polydiethylsiloxane-block-poly(4,4'-(1-phenylethylidene)bisphenol)carbonate), poly(poly(4,4'-isopropylidene)bisphenol)carbonate-block-polyethylsiloxane-block-poly(4,4'-isopropylidene)bisphenol)carbonate), poly(poly(4,4'-diphenylmethylidenebisphenol)carbonate-block-polyethylsiloxane-block-poly(4,4'-diphenylmethylidenebisphenol)carbonate), poly(poly(4,4'-cyclohexylidenebisphenol)carbonate-block-polydiethylsiloxane-block-poly(4,4'-cyclohexylidenebisphenol)carbonate), and the like. Additional examples include block copolymers where the polycarbonate blocks are prepared from more than one bisphenol structure, such as poly(poly(4,4'-cyclohexylidene-2,2'-dimethylbisphenol)-co-(4,4'-cyclohexylidenebisphenol)carbonate-block-polydiphenylsiloxane-block-polypoly(4,4'-cyclohexylidene-2,2'-dimethylbisphenol)-co-(4,4'-cyclohexylidenebisphenol)carbonate), poly(poly(4,4'-isopropylidenebisphenol)-co-(4,4'-cyclohexylidenebisphenol)carbonate-block-polydiphenylsiloxane-block-polypoly(4,4'-isopropylidenebisphenol)-co-(4,4'-cyclohexylidenebisphenol)carbonate), poly(poly(4,4'-hexafluoroisopropylidenebisphenol)-co-(4,4'-cyclohexylidenebisphenol)carbonate-block-polydiphenylsiloxane-block-polypoly(4,4'-hexafluoroisopropylidenebisphenol)-co-(4,4'-cyclohexylidenebisphenol)carbonate), poly(poly(4,4'-hexafluoroisopropylidenebisphenol)-co-(4,4'-(1,4-phenylenebisisopropylidene)bisphenol)carbonate-block-polydiphenylsiloxane-block-polypoly(4,4'-hexafluoroisopropylidenebisphenol)-co-(4,4'-(1,4-phenylenebisisopropylidene)bisphenol)carbonate), poly(poly(4,4'-(1-phenylethylidene)bisphenol)-co-(4,4'-(1,4-phenylenebisisopropylidene)bisphenol)carbonate-block-polydiphenylsiloxane-block-polypoly(4,4'-(1-phenylethylidene)bisphenol)-co-(4,4'-(1,4-phenylenebisisopropylidene)bisphenol)carbonate), and the like.

Examples of polycarbonate block segments selected for the process of the present invention include the polymer structures as illustrated in U.S. Pat. No. 4,921,940 (D/88100), the disclosure of which is totally incorporated herein by reference, which blocks are obtained from the reaction of diphenylcarbonate with 4,4'-dihydroxydiphenyl-1,1-ethane, 4,4'-dihydroxydiphenyl-1,1-isobutane, 4,4'-dihydroxydiphenyl-2,2-propane, 4,4'-dihydroxydiphenyl-4,4-heptane, 4,4'-dihydroxydiphenyl-1,1-cyclohexane, 4,4'-dihydroxy-3,3'-dimethyldiphenyl-2,2-propane, 4,4'-dihydroxy-3,3',5,5'-tetrachlorodiphenyl-2,2-propane, 4,4'-dihydroxydiphenylsulfone, 4,4'-dihydroxydiphenylether, copolymers thereof, and the polycarbonates as illustrated in the aforementioned copending application. Many of the structures thereof may be located in Hermann Schnell's Chemistry and Physics of Polycarbonates, *Polymer Reviews*, V. 9, Interscience Publishers, principally the structures found in Tables IV-1 pages 86 to 90 and also Tables IV-2, V-1, V-2, V-3, V-4, V-5, and V-6, the disclosure of which is totally incorporated herein by reference.

The polycarbonates of the present invention can be prepared by known polyesterification methods with the primary exception that polysiloxane telomers are incorporated therein during the polyesterification reaction. Examples of polysiloxane telomers present in effective amounts of, for example, from about 1 weight percent to about 20 weight percent and preferably from about 5 weight percent to about 15 weight percent include polydiphenyl siloxanes terminated with silanol end groups, polydimethyl siloxanes terminated with silanol end groups, silanol terminated siloxanes mixtures containing both methyl and phenyl groups attached to the silicon atom where the amounts of components in the mixture vary from about 5 to about 95 percent, respectively.

More specifically, the polycarbonates of the present invention can be prepared by the reaction of one or more, for example up to 5, preferably 3, and more preferably 2, in an embodiment bisphenols with a diaryl carbonate, especially bis(aryl)carbonates, reference U.S. Pat. No. 4,345,062, the disclosure of which is totally incorporated herein by reference, such as diphenyl carbonate; the bis(aryl)carbonates reactants are also commonly referred to as carbonic acid aromatic diesters and include those described by Formula III in U.S. Pat. No. 3,163,008, the disclosure of which is totally incorporated herein by reference, column 2, lines 23 to 72, and column 3, lines 1 to 42, with preferred bis(aryl)-carbonates being diphenyl carbonate, dicresyl carbonate, bis(2-chlorophenyl)carbonate, the bis-phenyl-carbonates of hydroquinone, resorcinol and 4,4'-dihydroxydiphenyl, the bisphenyl carbonates of the bis(4-hydroxyaryl)alkanes, cycloalkanes, ethers, sulfides, sulfones, and the like; and a silanol terminated polysiloxane telomer, such as polydiphenyl siloxane in the presence of a catalyst, such as metal alkoxides, such as titanium butoxide, titanium isopropoxide, zirconium isopropoxide; metal acetates, such as magnesium acetate, zinc acetate; tin compounds, such as dibutyltin oxide, di-n-butyltin dimethoxide, tetraborate compounds, such as tetramethyl ammonium tetraphenyl borohydride, a titanium or zirconium alkoxides, metal diacetates, organotin compounds or borohydride based compounds. The diphenylcarbonate is, in an embodiment, used in molar excess with respect to the total number of moles of bisphenol and polysiloxane telomer employed; this excess being in the range of from about 5 percent to about 30 percent and preferentially about 10 percent. The catalyst is employed in an effective amount of, for example, from about 0.01 percent to about 1.0 percent molar relative to the bisphenol content, and preferentially in an amount of from about 0.1 to about 0.3 based on the bisphenol. This mixture is heated with stirring in a one liter steel reactor capable of maintaining a vacuum of at least as low as 1.0 mbar. The reactor should also be capable of heating to a temperature at least as high as 300° C. and be equipped with a condenser for the collection of the byproducts, such as phenol, of the polymerization and the molar excess of diphenylcarbonate. Specifically, such a reaction can be conducted as follows: there can be added to a one liter reactor 1-phenylethylidenebisphenol, about 270 grams, or approximately one mole, together with a molar excess of diphenyl carbonate of about 10 percent or 273.4 grams. To this mixture is added about 30 grams of a silanol terminated polydiphenyl siloxane, such as Hüls Petrarch Systems product PS080. A catalyst, such as titanium butoxide, can be added in the amount of about 0.5 milliliter as the solid bisphenols and diphenylcarbonate melt with heating. Heating is accomplished by electric element heater that surrounds the reactor vessel. The monomer mixture comprised of the bisphenols and diphenylcarbonate melts in the temperature range of about 80° C. to about 140° C. Upon melting, the reactor is sealed, stirring initiated, and a continuous stream of dry nitrogen gas is flushed through the reactor for 50 minutes. The reactor temperature is raised to about 220° C. over a period of about 50 minutes. This temperature is maintained while the pressure in the reactor is lowered by means of a mechanical vacuum pump. The pressure is lowered from about 1,000 mbar to about 500 mbar over a period of about 10 minutes. The pressure is then further reduced to about 0 mbar over a period of about 80 minutes. After the temperature has been maintained at 220° C. for about 100 to about 160 minutes, the temperature is increased to about 260° C. over a period of about 20 minutes. This temperature is maintained for about 90 minutes. The progress of the reaction may be monitored by the rise in the stirrer torque, the stirrer torque increases as the melt viscosity increases and the rise in the viscosity is caused by the increase in the polymer molecular weight as the reaction progresses or by the collection of the phenol byproduct, since 2 moles of phenol are produced by every mole of bisphenol that polymerizes, the extent of the polymerization can be directly followed. The temperature is then increased to about 280° C. in about 10 minutes. This temperature is maintained for about 120 minutes. The temperature is then increased to about 300° C. in about 10 minutes. This temperature is maintained for about 120 minutes. The reactor is then repressurized with dry nitrogen gas to atmospheric pressure and the molten polymer is drawn with large forceps from the reactor bottom into a dry inert atmosphere and cut with wire cutters where it is permitted to cool to room temperature, about 25° C., to provide the product poly(poly(4,4'-(1-phenylethylidene)bisphenol)carbonate-block-polydiphenylsiloxane-block-poly(4,4'-(1-phenylethylidene)bisphenol)carbonate) (a:10:c mass percent). Subsequent to effecting purification of the product, it can be treated by the process outlined in U.S. Pat. No. 4,921,940, the disclosure of which is totally incorporated herein by reference, whereby, for example, 10 grams of the polycarbonate product was added to 100 milliliters of dimethylformamide as the polymer solvent containing 0.25 gram of tartaric acid as the complexing component. Following stirring of the mixture for 16 hours, the resulting polymer solution was precipitated into 3 liters of rapidly stirring deionized water. The polymer was recovered by filtration and dried overnight in a vacuum oven at about 80 degrees Celsius. The polymer obtained may be characterized by GPC to confirm siloxane incorporation into a high molecular weight polymer. Siloxane incorporation into the polymer backbone was determined by both NMR and by Supercritical Fluid Extraction of the polymer.

Examples of specific hole transporting molecules in addition to the aryl amines disclosed herein include, but are not limited to, those molecules of the following formulas wherein X is independently selected from halogen or alkyl, and preferably N,N'-diphenyl-N,N'-bis(3-methylphenyl)-(1,1'-biphenyl)-4,4'-diamine.

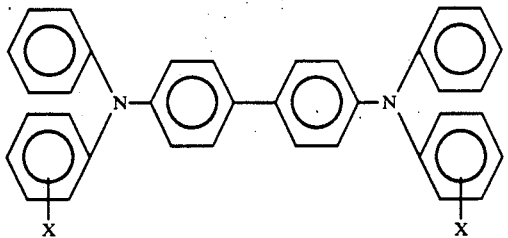

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, and applying thereto a photogenerating layer, and overcoating thereon a charge transport layer dispersed in the polycarbonate resinous binder illustrated herein. The photoresponsive imaging members of the present invention can be fabricated by common known coating techniques such as by dip coating, draw-bar coating, or by spray coating process, depending mainly on the type of imaging devices desired. Each coating, however, can be usually dried, for example, in a convection or forced air oven at a suitable temperature before a subsequent layer is applied thereto. In one embodiment of the present invention, the transport layer can be fabricated from a 10 weight percent solution of the charge transporting molecules, which molecules are usually present in an amount of from about 35 to about 60 weight percent, and preferably 40 weight percent, and are dispersed in the polycarbonate resinous binder illustrated herein, preferably in an amount of 60 weight percent. The aforementioned solution can be obtained by stirring 6 grams of the selected polycarbonate and 4 grams of the charge transport molecule in 100 milliliters of toluene at ambient temperature. The resulting solution can then be draw bar coated on the photogenerating layer and thereafter dried. The drying temperature is dependent on a number of factors including the components selected, particularly the photogenerating component, but generally drying is accomplished at about 130° C., especially in situations wherein trigonal selenium is selected as the photogenerating pigment dispersed in a polyvinyl carbazole binder.

In a illustrative embodiment, the photoconductive imaging member of the present invention is comprised of (1) a conductive supporting substrate of Mylar with a thickness of 75 microns and a conductive vacuum deposited layer of titanium with a thickness of 0.02 micron; (2) a hole blocking layer of N-methyl-3-aminopropyltrimethoxy silane with a thickness of 0.1 micron; (3) an adhesive layer of 49,000 Polyester (obtained from E. I. DuPont Chemical) with a thickness of 0.05 micron; (4) a photogeneration layer of trigonal selenium with a thickness of 1 micron; and (5) a charge transport layer with a thickness of 20 microns of an aryl amine dispersed in a resin binder of a block copolycarbonate of bisphenol and polydiphenyl siloxane.

DETAILED DESCRIPTION OF THE INVENTION

Figure 1:
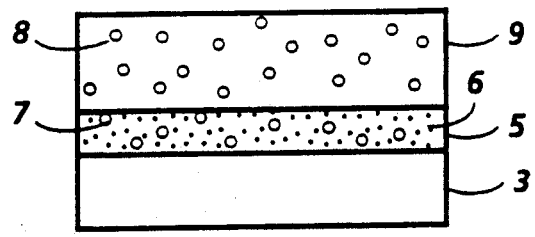
FIG. 1 represents a partially schematic cross-sectional view of a photoresponsive imaging member of the present invention.

Illustrated in FIG. 1 is a photoresponsive imaging member of the present invention comprising a supporting substrate 3 of a thickness of from about 50 microns to about 5,000 microns, a charge carrier photogenerating layer 5 of a thickness of from about 0.5 micron to about 5 microns comprised of photogenerating pigment s6 optionally dispersed in a resinous binder composition 7, and a hole transport layer 9 of a thickness of from about 10 microns to about 60 microns comprised of an aryl amine dispersed in the polycarbonate illustrated herein resin binder 8.

Figure 2:
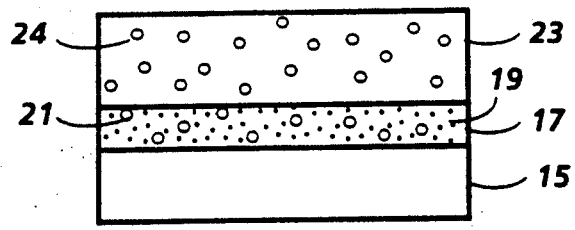
FIGS. 2 and 3 represent partially schematic cross-sectional views of photoresponsive imaging members of the present invention.

Illustrated in FIG. 2 is a photoresponsive imaging member of the present invention comprised of about a 25 micron to about a 100 micron thick conductive supporting substrate 15 of aluminized Mylar, a 0.5 micron to about a 5 micron thick photogenerating layer 17 comprised of trigonal selenium photogenerating pigments 19 dispersed in a resinous binder 21 in the amount of 10 percent to about 80 percent by weight, and a 10 micron to about a 60 micron thick hole transport layer 23 comprised of the aryl amine charge transport N,N'-diphenyl-N,N'-bis(3-methylphenyl)1,1'-biphenyl-4,4'-diamine dispersed in the polycarbonate resin binder 24 poly(4,4'-(1-phenylethylidene)bisphenol carbonate with 10 weight percent of polydiphenyl siloxane blocks, based on the amount of polydiphenyl siloxane added to the polymerization, and confirmed by NMR integration; additionally, covalent incorporation of the polysiloxane blocks is supported by the absence of a separate low molecular weight peak in GPC studies of the polymer and by the low amount of free polysiloxane extracted by SFE/SFC studies, which polycarbonate has a number average molecular weight of about 21,000, and a weight average molecular weight of about 67,500, and a dispersity of about 3.25 as determined by a Waters Gel Permeation Chromatograph employing four Ultrastyragel© columns with pore sizes of 100, 500, 500, $10^4$ Angstroms and using THF as solvent. The polydiphenyl siloxane blocks are believed to be incorporated randomly along the polymer chain length.

Figure 3:
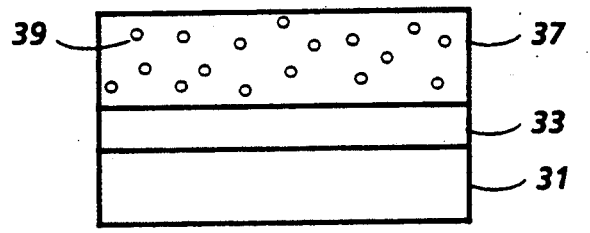

Another photoresponsive imaging member of the present invention, reference FIG. 3, is comprised of a conductive supporting substrate 31 of aluminum of a thickness of 50 microns to about 5,000 microns, a photogenerating layer 33 comprised of amorphous selenium or an amorphous selenium alloy, especially selenium arsenic alloy (99.5/0.5) or a selenium tellurium alloy (75/25), of a thickness of 0.1 micron to about 5 microns, and a 10 micron to about 60 micron thick hole transport layer 37 comprised of the aryl amine hole transport N,N'-diphenyl-N,N'-bis(3-methylphenyl)1,1'-biphenyl-4,4'-diamine, 55 weight percent, dispersed in the polycarbonate resin binder 39 of FIG. 2.

Figure 4:
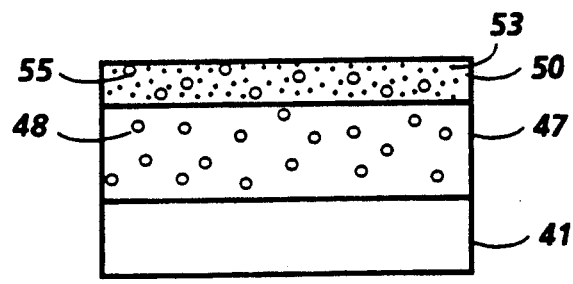
FIG. 4 represents a partially schematic cross-sectional view of a photoresponsive imaging member of the present invention wherein the hole transporting layer is situated between a supporting substrate and the photogenerating layer.

Illustrated in FIG. 4 is another photoresponsive imaging member of the present invention comprised of a 25 micron to 100 micron thick conductive supporting substrate 41 of aluminized Mylar, a 10 micron to about 70 micron thick hole transport layer 47 comprised of N,N'-diphenyl-N,N'-bis(3-methylphenyl)1,1'-biphenyl-4,4'-diamine hole transport molecules, 55 weight percent, dispersed in the polycarbonate resin binder poly(4,4'-(1-phenylethylidene)bisphenol carbonate 48 with 10 weight percent of polydiphenylsiloxane blocks, and a 0.1 micron to about 5 micron thick photogenerating layer 50 comprised of vanadyl phthalocyanine photogenerating pigments 53 optionally dispersed in a polyester resinous binder 55 in an amount of about 10 percent to about 80 percent by weight.

The supporting substrate layers may be opaque or substantially transparent and may comprise any suitable material possessing, for example, the requisite mechanical properties. The substrate may comprise a layer of an organic or inorganic material having a conductive surface layer arranged thereon or a conductive material such as, for example, aluminum, chromium, nickel, indium, tin oxide, brass or the like. The substrate may be flexible, seamless, or rigid and can be comprised of various different configurations such as, for example, a plate, a cylindrical drum, a scroll, and the like. The thickness of the substrate layer is dependent on many factors including, for example, the components of the other layers, and the like; generally, however, the substrate is generally of a thickness of from about 50 microns to about 5,000 microns.

Examples of photogenerating layers, especially since they permit imaging members with a photoresponse of from about 400 to about 700 nanometers, for example, include those comprised of known photoconductive charge carrier generating materials, such as amorphous selenium, selenium alloys, halogen doped amorphous selenium, doped amorphous selenium alloys doped with chlorine in the amount of from about 50 to about 200 parts per million, and trigonal selenium, cadmium sulfide, cadmium selenide and cadmium sulfur selenide, and the like, reference U.S. Pat. Nos. 4,232,102 and 4,233,283, the disclosures of each of these patents being totally incorporated herein by reference. Examples of specific alloys include selenium arsenic with from about 95 to about 99.8 weight percent selenium; selenium tellurium with from about 70 to about 90 weight percent of selenium; the aforementioned alloys containing dopants, such as halogens, including chlorine in amounts of from about 100 to about 1,000 parts per million, ternary alloys, and the like. The thickness of the photogenerating layer is dependent on a number of factors, such as the materials included in the other layers, and the like; generally, however, this layer is of a thickness of from about 0.1 micron to about 5 microns, and preferably from about 0.2 micron to about 2 microns, depending on the photoconductive volume loading, which may vary from about 5 percent to about 100 percent by weight. Generally, it is desirable to provide this layer in a thickness which is sufficient to absorb about 90 percent or more of the incident radiation which is directed upon it in the imagewise exposure step. The maximum thickness of this layer is dependent primarily upon factors such as mechanical considerations, for example, whether a flexible photoresponsive device is desired. Also, there may be selected as photogenerators organic components such as squaraines, perylenes, reference for example U.S. Pat. No. 4,587,189, the disclosure of which is totally incorporated herein by reference, metal phthalocyanines, metal free phthalocyanines, vanadyl phthalocyanine, dibromoanthanthrone, and the like.

The hole transport layer can be comprised of one or a mixture of hole transporting molecules in the amount of from about 10 percent to about 60 percent by weight thereof in some embodiments of the transport molecules illustrated herein, and preferably the aryl amines of the formula illustrated herein. The thickness of the transport layer is, for example, from about 5 microns to about 50 microns with the thickness depending predominantly on the nature of intended applications. In addition, a layer of adhesive material located, for example, between the transport layer and the photogenerating layer to promote adhesion thereof can be utilized. This layer may be comprised of known adhesive materials such as polyester resins, reference 49,000 polyester available from E. I. DuPont Chemical Company, polysiloxane, acrylic polymers, and the like. A thickness of from about 0.001 micron to about 0.1 micron is generally employed for the adhesive layer. Hole blocking layers usually situated between the substrate and the photogenerating layer, and preferably in contact with the supporting substrate include, for example, those derived from the polycondensation of aminopropyl trialkoxysilane or aminobutyl trialkoxysilane, such as 3-aminopropyltrimethoxy silane, 3-aminopropyltriethoxy silane, or 4-aminobutyltrimethoxy silane thereby improving in some embodiments the dark decay characteristics of the imaging member. Typically, this layer has a thickness of from about 0.001 micron to about 5 microns or more in thickness, depending on the desired effectiveness for preventing or minimizing the dark injection of charge carriers into the photogenerating layer.

With the layered imaging members of the present invention, wherein the photogenerating layer is comprised of trigonal selenium, this member when charged to a negative voltage of 800 volts with a corotron had a photosensitivity of 2.0 ergs per square centimeter. The residual voltage buildup for this imaging member was negligible as determined, for example, with a volt meter (about 8 volts) after 1,000 imaging cycles in a xerographic imaging test fixture. The overall electrical performance (photosensitivity, cyclic stability, and dark decay) was superior to a similar imaging member fabricated with a polycarbonate (Lexan), 45 weight percent, as resin binder for the charge transport molecule. The aforementioned imaging member of the present invnetion exhibited an increase in yield strength and tensile toughness compared to a similar imaging member compared with a polycarbonate such as polycarbonate Z.

The imaging members of the present invnetion can be selected for electrostatographic, especially xerographic, imaging and printing processes wherein, for example, a positively, or negatively charged imaging member is selected, and developing the image with toner comprised of resin, such as styrene acrylates, styrene methacrylates, styrene butadienes, and the like, pigment, such as carbon black, and a charge additive such as distearyl dimethyl ammonium methyl sulfate.

The following examples, except for any comparative examples, are being supplied to further define specific embodiments of the present invention, it being noted that these examples are intended to illustrate and not limit the scope of the present invention. Also, parts and percentages are by weight unless otherwise indicated.

EXAMPLE I

In the following Examples, unless otherwise noted, there was selected a one liter stainless steel reactor equipped with a helical coil stirrer and a double mechanical seal. The stirrer was driven by a one-half horse power motor with a 30:1 gear reduction, and a torque meter was included on the stirrer drive. The reactor was heated electrically, and the pressure was monitored by both a pressure transducer, and a pirani gauge, while the temperature was determined by a platinum RTD. A specifically designed condensor ensures the efficient condensation of phenol and diphenylcarbonate; these materials are both solids at room temperature and the condenser design ensures that when they solidify they do not plug a line between the reactor and the vacuum pump which would cause the reaction to cease. In addition, at the low pressures below from 0.1 to 100 mbar used at the reaction end phenol has sufficient vapor pressure at room temperature and above that it can interfere with the polymerization by either raising the lowest pressure achievable by the system or by subliming to other parts of the condenser and plugging a line. In this condenser, the diameter of the pipe from the reactor to the condenser was $\frac{3}{8}$". The major fraction of the line consists of flexible steel piping to avoid having to exactly position both reactor and condenser. A heating mantle was used to wrap this line. The condensation takes place in a 6 inch diameter stainless steel pipe about 16 inches long. The condensing surface itself consists of five 12 inch flexible steel tubes running parallel to each other, hung vertically, with four tubes arranged around the central one. To cool the condensing surface, there was used cold nitrogen gas. The cold nitrogen enters the four outer tubes, descends to the bottom, then rises up the central tube. The nitrogen flow is controlled by a flow meter with a typical flow rate in the range of 20 to 30 liters minute$^{-1}$. This tube assembly was hung from a weigh cell by a small universal joint. The inlet and outlet are long flexible steel tubes. This length along the horizontal axis should minimize the vertical force. Since the load cell deflection is quite small, a uniform, consistent force shunt occurs that can be corrected for by calibrating the cell. The byproducts such as phenol, cresol, chlorophenol, a mixture of phenol and hydroquinone, a mixture of phenol and resorcinol, a mixture of phenol and biphenol, or a mixture of phenol with one of 4,4'-dihydroxyarylalkanes, 4,4'-dihydroxycycloalkanes, 4,4'-dihydroxyethers, 4,4'-dihydroxysulfides, 4,4'-dihydroxysulfones, and the like drips as a liquid into the glass bottom portion of the condenser which was joined to the upper stainless steel portion by a ball valve. This glass piece at the bottom is a 250 milliliters graduated cylinder. Through this glass the amount and rate of phenol condensation can be monitored. When the reaction pressure was low enough, usually between 10 about 100 mbars, that the vapor pressure of the phenol becomes a significant contribution to the reactor pressure, the ball valve is closed to isolate the bulk of the phenol and the temperature of the ntrogen gas in the condensing element is lowered to below $-80°$ C. In this manner, solid phenol was collected, and the rate and amount of collection can be monitored by the weigh cell electronic signal. The line leaving the condenser to the vacuum pump is ½ inch in diameter to further reduce any chance of plugging. Since the polymerization is driven by the removal of phenol, which in turn is driven by pressure and temperature, control of these variables is most important. A series of valves, a rotary oil pump, and a surge tank provided controlled variations in reactor pressure.

There was added to the above reactor 270.0 grams of bisphenol (z) (4,4'-cyclohexylidenediphenol) as obtained by the process as illustrated in Example I of U.S. Pat. No. 4,766,255, the disclosure of which is totally incorporated herein by reference; 30 grams of polydiphenylsiloxane, silanol terminated, obtained from Petrarch Systems (now Huls); 273.4 grams of diphenylcarbonate and 0.50 milliliter of titanium (IV) butoxide. The reactor was then sealed and heated to 220° C., and the pressure lowered from 1,000 millibar (atmospheric pressure) to about 500 mbar in a period of about 15 minutes. Phenol began to collect in the condenser and the amount was observed through the lower glass portion of the condenser. The rate of pressure decrease was then slowed so that about 80 minutes were required to reach a pressure of 5 mbar. During the slow pressure drop about 110 to 130 milliliters of phenol was observed to collect in the lower glass portion of the condenser. When the pressure reached about 100 mbar, the temperature of the nitrogen gas cooling the condensing element was lowered from about 16° C. to about $-84°$ C. After 150 minutes at 220° C. the temperature was increased to 260° C. and heating was continued for 90 minutes. Thereafter, the temperature was increased to 280° C. and heating was continued for 120 minutes. Thereafter, the temperature was increased to 300° C. and heating was continued for 120 minutes, and the molten polymer resulting was drawn from the reactor by pulling with large forceps into a dry nitrogen atomsphere to prevent hydrolysis or oxidation of the heated polymer, which after cooling had a weight average molecular weight in polystyrene equivalents of 37,000 as determined by GPC. Ten (10) grams of the obtained polycarbonate product was added to 100 milliliters of dimethylformamide as the polymer solvent containing 0.25 gram of tartaric acid as the complexing component. Following the stirring of the mixture for 16 hours, the resulting polymer solution was precipitated into 3 liters of rapidly stirring deionized water. The polymer poly(poly(4,4'-cyclohexylidenebisphenol)carbonate-block-polydiphenylsiloxane-block-poly(4,4'-cyclohexylidenebisphenol)carbonate) with a GPC weight molecular weight of 55,300 and Tg of 152° C. was recovered by filtration and dried overnight (18 hours) in a vacuum oven at about 80 degrees Celsius. This polymer was tested as a free standing film in an Instron materials testing system (Model #1123) and found to have a yield strength of 71.1 Megapascals and a modulus of 2.4 Gigapascals. This can be compared to a polymer without polysiloxane blocks, such as the homopolymer, poly(4,4'-cyclohexylidenebisphenol)carbonate with a GPC weight molecular weight of 57,400 prepared by the same polyesterification process of this example, that displayed, as a free standing film, a yield strength of 59.7 Megapascals and a modulus of 2.0 Gigapascals.

EXAMPLE II

The processes of Example I were repeated with the exceptions that there were selected 270 grams of bisphenol (z) (4,4'-cyclohexylidenediphenol); 31.2 grams of (85 to 88 percent) dimethyl-(12 to 15 percent)-diphenyl siloxane, silanol terminated (Petrarch Systems PS085); and 273.4 grams of diphenylcarbonate. There resulted a block copolymer poly(poly(4,4'-cyclohexylidenebisphenol)carbonate-block-poly(diphenylsiloxane-co-dimethylsiloxane)-block-poly(4,4'-cyclohexylidenebisphenol)carbonate) with a GPC weight molecular weight of 39,000.

EXAMPLE III

The processes of Example I were repeated with the exceptions that there were selected 270 grams of bisphenol (AP) (4,4'-(1-phenylethylidene)bisphenol); 30 grams of diphenyl siloxane, silanol terminated (Petrarch Systems PS080); and 273.4 grams of diphenylcarbonate. There resulted a block copolymer poly(poly(4,4'-(1-phenylethylidene)bisphenol)carbonate-block-polydiphenylsiloxane-block-poly(4,4'-(1-phenylethylidene)-bisphenol)carbonate) (a:10:c mass percent) with a GPC weight molecular weight of 68,000.

EXAMPLE IV

The processes of Example I were repeated with the exceptions that there were selected 285 grams of bisphenol (AP) (4,4'-(1-phenylethylidene)bisphenol); 15 grams of diphenyl siloxane, silanol terminated (Petrarch Systems PS080); and 273.4 grams of diphenylcarbonate. There resulted a block copolymer poly(poly(4,4'-(1-phenylethylidene)bisphenol)carbonate-block-polydiphenylsiloxane-block-poly(4,4'-(1-phenylethylidene)-bisphenol)carbonate) (a:5:c mass percent) with a GPC weight molecular weight of 44,000.

EXAMPLE V

The processes of Example I were repeated with the exceptions that there were selected 255 grams of bisphenol (AP) (4,4'-(1-phenylethylidene)bisphenol); 45 grams of diphenyl siloxane, silanol terminated (Petrarch Systems PS080); and 273.4 grams of diphenylcarbonate. There resulted a block copolymer poly(poly(4,4'-(1-phenylethylidene)bisphenol)carbonate-block-polydiphenylsiloxane-block-poly(4,4'-(1-phenylethylidene)-bisphenol)carbonate) (a:15:c mass percent) with a GPC weight molecular weight of 68,000 and a Tg of 157° C.

EXAMPLE VI

The processes of Example I were repeated with the exceptions that there were selected 240 grams of bisphenol (AP) (4,4'-(1-phenylethylidene)bisphenol); 60 grams of diphenyl siloxane, silanol terminated (Petrarch Systems PS080); and 273.4 grams of diphenylcarbonate. There resulted a block copolymer poly(poly(4,4'-(1-phenylethylidene)bisphenol)carbonate-block-polydiphenylsiloxane-block-poly(4,4'-(1-phenylethylidene)-bisphenol)carbonate) (a:20:c mass percent) with a GPC weight molecular weight of 52,000 and a bimodal distribution.

EXAMPLE VII

The processes of Example I were repeated with the exceptions that there were selected 270 grams of bisphenol (AP) (4,4'-(1-phenylethylidene)bisphenol); 30 grams of diphenyl siloxane, silanol terminated (Petrarch Systems PS080); and 273.4 grams of diphenylcarbonate and the catalyst employed was tetramethyl ammonium tetraphenyl borohydride. There resulted a block copolymer poly(poly(4,4'-(1-phenylethylidene)bisphenol)carbonate-block-polydiphenylsiloxane-block-poly(4,4'-(1-phenylethylidene)bisphenol)carbonate) (a:20:c mass percent) with a GPC weight molecular weight of 9,000.

EXAMPLE VIII

The processes of Example I were repeated with the exceptions that there were selected 270 grams of bisphenol (P) (4,4'-(1,2-phenylenebisisopropylidene)bisphenol); 30 grams of diphenyl siloxane, silanol terminated (Petrarch Systems PS080); and 273.4 grams of diphenylcarbonate. There resulted a block copolymer, poly(poly(4,4'-(1,4-phenylenebisisopropylidene)bisphenol)carbonate-block-polydiphenylsiloxane-block-poly(4,4'-(1,4-phenylenebisisopropylidene)bisphenol)-carbonate) with a GPC weight molecular weight of 68,900.

EXAMPLE IX

The polymer of Example III and a polycarbonate Z comparative polymer obtained from Mitsubishi Chemical with viscosity average molecular weight of 26,000 of the same bisphenol structure but without the siloxane incorporation (poly(4,4'-(1-phenylethylidene)bisphenol)carbonate were comparatively tested as follows: two layered photoresponsive imaging members containing the hole transport molecule, N,N'-diphenyl-N,N'-bis(3-methylphenyl)-1,1'-biphenyl-4,4'-diamine in the above polycarbonate binders respectively as the charge transport layer and trigonal selenium as the photogenerator was prepared as follows:

A solution for the charge transport layer was prepared by dissolving 1.0 gram of N,N'-diphenyl-N,N'-bis(3-methylphenyl)-1,1'-biphenyl-4,4'-diamine and 1.0 gram of the above polycarbonates, respectively, in 10 milliliter of methylene chloride. This solution was coated on top of a trigonal selenium generator layer by means of a Bird film applicator. The resulting photoreceptor devices with an aluminized Mylar substrate with a thickness of 75 microns was dried in a forced air oven at 135° C. for 20 minutes resulting in an 24 micron thick hole transport layer. Mechanical testing was done with samples of the above prepared photoreceptor devices with a sample size of 5 centimeters in length and with a width of 1.5 centimeters. Tensile tests were then conducted on an Instron materials testing system (Model #1123) employing a strain rate of 0.20 minute. The type of test used was a tensile test for films and coatings, ASTM test method D 882, capable of calculating the Young's modulus, tensile strength, yield strength, percent elongation and tensile toughness. The tensile toughness is the area of the stress-strain curve when the sample is strained to the breaking point. The results are contained in the following table. The Young's modulus is the ratio of the tensile stress to the strain in the linear portion of the stress-strain curve. The result is expressed in force per unit area usually gigapascals (GPa) or pounds force per square inch (psi). The tensile strength is calculated by deviding the load at breaking point by the original cross-sectional area of the test specimen. The result is expressed in force per unit area usually megapascals (MPa) or pounds-force per square inch (psi). The yield strength is calculated by dividing the load at the yield point by the original cross-sectional area of the test specimen. The result is expressed in force per unit area, usually megapascals (MPa) or pounds-force per square inch (psi). The percentage elongation at break is calculated by dividing the elongation at the moment of rupture of the test specimen by the initial gauge length (for example 5 centimeters in this example) of the specimen and multiplying by 100. The tensile toughness is the total energy absorbed per unit volume of the specimen up to the point of rupture. The result is expressed in units of Joules cm$^{-3}$.

TABLE 1

| MECHANICAL PROPERTIES OF POLYMER BINDERS FOR P/R | | | | | |
|---|---|---|---|---|---|
| Polymer Structure | Young's Modulus GPa | Tensile Strength MPa | Yield Strength MPa | Percent Elongation | Tensile Toughness Joules/cm$^3$ |
| Comparative Polymer | 3.73 | 94.74 | 87.85 | 4.58 | 2.67 |
| Example III Polymer | 4.24 | 165.64 | 68.51 | 85.08 | 93.22 |

EXAMPLE X

A photoresponsive imaging member was prepared by providing an aluminized Mylar substrate in a thickness of 75 microns, followed by applying thereto with a multiple-clearance film applicator a solution of N-methyl-3-aminopropyl-trimethoxy silane (obtained from PCR Research Chemicals) in ethanol (1:20 volume ratio). This hole blocking layer, 0.1 micron, was dried for 5 minutes at room temperature, and then cured for 10 minutes at 110° C. in a forced air oven. There was then applied to the above silane layer a solution of 0.5 percent by weight of 49,000 polyester (obtained from E. I. DuPont Chemical) in a mixture of methylene chloride and 1,1,2-trichloroethane (4:1 volume ratio) with a multiple-clearance film applicator. The layer was allowed to dry for one minute at room temperature, and 10 minutes at 100° C. in a forced air oven. The resulting adhesive layer had a dry thickness of 0.05 micron.

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. A 1.0 micron thick photogenerator layer was then fabricated by coating the above dispersion onto the above adhesive layer present on the Mylar substrate with a multiple-clearance film applicator, followed by drying in a forced air oven at 135° C. for 5 minutes.

A solution of 4.0 grams of the aryl amine N,N'-diphenyl-N,N'-bis(3-methylphenyl)1,1'-biphenyl-4,4'-diamine and 6 grams of a block copolycarbonate of bisphenol and polydiphenylsiloxane, obtained from Example I, resin binder in 100 milliliters of methylene chloride was then coated over the photogenerator layer by means of a multiple-clearance film applicator. The resulting member was subsequently dried in a forced air oven at 130° C. for 30 minutes resulting in a 22 micron thick hole transport layer with 60 weight percent of the resin binder comprised of a block copolycarbonate of bisphenol and polydiphenyl siloxane of Example II.

The above fabricated imaging member was electrically tested by negatively charging it with a corona, and discharged by exposing it to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponds to the surface potential. Also, the cylinder enclosing the wire loop was connected to the ground.

The above imaging member was negatively charged to a surface potential of 800 volts, and discharged to a residual potential of 15 volts. The dark decay of this device was about 20 volts/second. Further, the electrical properties of the above prepared photoresponsive imaging member remained essentially unchanged for 10,000 cycles of repeated charging and discharging.

EXAMPLE XI

A layered photoresponsive imaging member was fabricated by repeating the procedure of Example VIII with the exceptions that a 0.5 micron thick layer of amorphous selenium photogenerating components on a ball grained aluminum plate of a thickness of 7 mils (175 microns) was utilized, and wherein conventional vacuum deposition techniques were selected. Vacuum deposition of the selenium photogenerating layer was accomplished at a vacuum of $10^{-6}$ Torr, while the substrate was maintained at about 50° C. Thereafter, the resulting imaging device was dried in a forced air oven at 40° C. for 1 hour to form a 20 micron thick hole transport layer. Subsequently, the imaging member was cooled to room temperature, followed by electrical testing by repeating the procedure of Example VIII with the exception that a 450 nanometer monochromatic light was selected for irradiation. This imaging member was negatively charged to 850 volts and discharged to a residual potential of 30 volts. The dark decay of this device was 5 volts/second.

EXAMPLE XII

A layered photoresponsive imaging member was prepared by repeating the procedure of Example VIII by depositing a 0.5 micron thick layer of amorphous selenium on a ball grained aluminum plate of a thickness of 7 mils with the exception that the polycarbonate polymer resin binder of Example III was selected in place of the polymer resin binder of Example II. Thereafter, the resulting device or imaging member was dried in a forced air oven at 40° C. for 1 hour to form a 25 micron thick hole transport layer. Subsequently, the imaging member was cooled to room temperature, followed by electrical testing by repeating the procedure of Example III with the exception that a 450 nanometer monochromatic light was selected for irradiation. Specifically, this imaging member was negatively charged to 800 volts and discharged to a residual potential of 90 volts. The electrical performance as indicated by photosensitivity, dark decay, and residual voltage of this imaging member remained essentially the same after 1,000 cycles of repeated charging and discharging.

It is believed that images with excellent resolution with substantially no background deposits can be obtained with the imaging members of the present invention subsequent to development with known toner compositions comprised, for example, of styrene n-butyl methacrylate copolymer resin, 88 weight percent, 10 weight percent of carbon black, and 2 weight percent of the charge additive distearyl dimethyl ammonium methyl sulfate, reference U.S. Pat. No. 4,560,635, the disclosure of which is totally incorporated herein by reference.

Although the invention has been described with reference to specific preferred embodiments, it is not intended to be limited thereto, rather those skilled in the art will recognize variations and modifications may be made therein which are within the spirit of the invention and within the scope of the following claims.

What is claimed is:

1. A photoconductive imaging member comprised of a photogenerating layer and a transport layer comprised of transport molecules dispersed in a resinous binder comprised of the block copolymers or a block copolymer of the formula

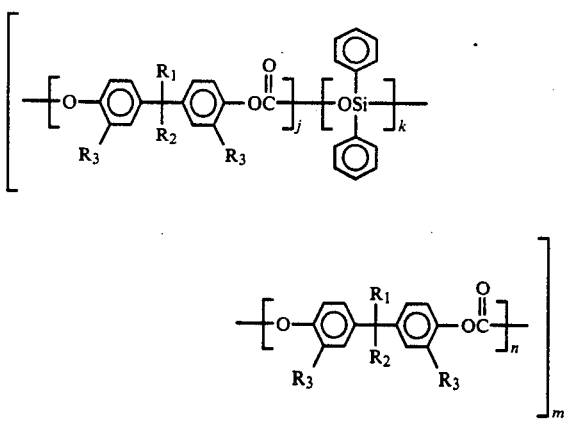

wherein $R_1$, $R_2$, and $R_3$ are independently selected from the group consisting of hydrogen, alkyl and aryl; k, j, m and n represent the number of repeating segments.

2. A photoconductive imaging member comprised of supporting substrate, a photogenerating layer, and a hole transport layer comprised of hole transport molecules dispersed in a resinous binder comprised of the block copolymers or a block copolymer of the formula

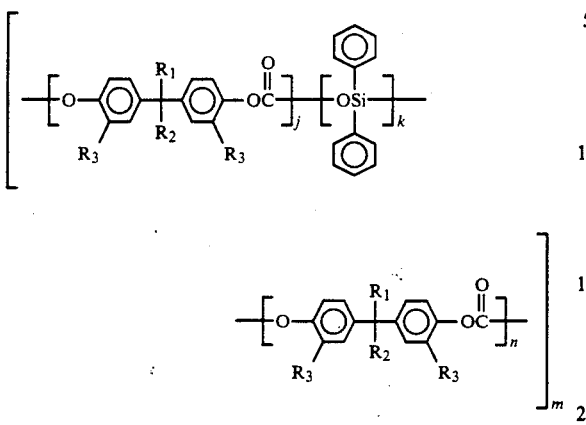

wherein $R_1$, $R_2$, and $R_3$ are independently selected from the group consisting of hydrogen, alkyl and aryl; k, j, m and n represent the number of repeating segments.

3. A photoconductive imaging member comprised of supporting substrate, a photogenerating layer, and a hole transport layer comprised of aryl amine hole transport molecules dispersed in a resinous binder comprised of the block copolymer or a block copolymer of the formula

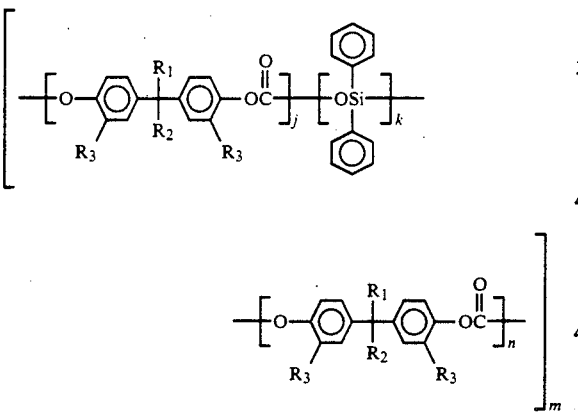

wherein $R_1$, $R_2$, and $R_3$ are independently selected from the group consisting of hydrogen, alkyl and aryl; k, j, m and n represent the number of repeating segments.

4. A photoconductive imaging member in accordance with claim 1 wherein $R_1$ and $R_2$ are independently selected from the group consisting of methyl, ethyl, phenyl, benzyl, naphthyl, cyclohexyl, t-butylcyclohexyl, phenylcyclohexyl, and cycloheptyl.

5. A photoconductive imaging member in accordance with claim 2 wherein $R_1$ and $R_2$ are independently selected from the group consisting of methyl, ethyl, phenyl, benzyl, naphthyl, cyclohexyl, t-butylcyclohexyl, phenylcyclohexyl, and cycloheptyl.

6. A photoconductive imaging member in accordance with claim 3 wherein $R_1$ and $R_2$ are independently selected from the group consisting of methyl, ethyl, phenyl, benzyl, naphthyl, cyclohexyl, t-butylcyclohexyl, phenylcyclohexyl, and cycloheptyl.

7. A photoconductive imaging member in accordance with claim 2 wherein the transport layer contains aryl diamine hole transport molecules.

8. A photoconductive imaging member in accordance with claim 2 wherein the hole transport molecules are comprised of aryl amines of the formula

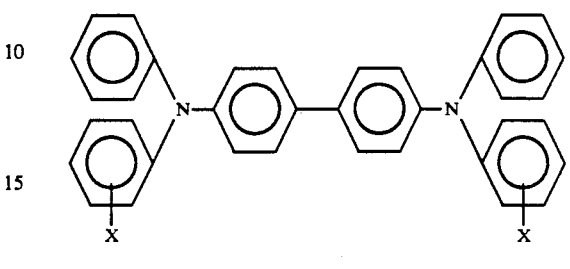

wherein X is independently selected from the group consisting of alkyl and halogen.

9. A photoconductive imaging member in accordance with claim 8 wherein the hole transport molecules are comprised of the aryl amine N,N'-diphenyl-N,N'-bis(3-methyl phenyl)-(1,1'-biphenyl)-4,4'-diamine.

10. A photoconductive imaging member in accordance with claim 2 wherein the supporting substrate is comprised of a conductive component on an organic polymeric composition.

11. a photoconductive imaging member in accordance with claim 2 wherein the photogenerating layer is comprised of inorganic or organic photoconductive pigments.

12. A photoconductive imaging member in accordance with claim 11 wherein the photogenerating layer is comprised of selenium, selenium alloys, trigonal selenium, vanadyl phthalocyanine, squaraines, perylenes, metal free phthalocyanines, metal phthalocyanines, dibromoanthanthrone pigments, or mixtures thereof.

13. A photoconductive imaging member in accordance with claim 2 wherein the photogenerating layer is situated between a supporting substrate and the charge transport layer.

14. A photoconductive imaging member in accordance with claim 2 wherein the hole transport layer is situated between the photogenerating layer and a supporting substrate.

15. A photoconductive imaging member in accordance with claim 2 wherein the photogenerating layer is comprised of photogenerating pigments dispersed in a resinous binder in an amount of from about 5 percent by weight to about 95 percent by weight.

16. A photoconductive imaging member in accordance with claim 15 wherein the resinous binder is a polyester, polyvinyl butyral, a polycarbonate, or polyvinyl formal.

17. A photoconductive imaging member in accordance with claim 2 containing a charge blocking layer and an adhesive layer.

18. A photoconductive imaging member in accordance with claim 2 containing an organosilane charge blocking layer and an adhesive layer.

19. A photoconductive imaging member in accordance with claim 2 containing a charge blocking layer and an adhesive layer.

20. A method of imaging which comprises generating an electrostatic image on the imaging member of claim 1; subsequently transferring this image to a suitable substrate; and thereafter permanently affixing the image thereto.

21. A method of imaging which comprises generating an electrostatic image on the imaging member of claim 2, subsequently transferring this image to a suitable substrate; and thereafter permanently affixing the image thereto.

22. A method of imaging which comprises generating an electrostatic image on the imaging member of claim 3, subsequently transferring this image to a suitable substrate; and thereafter permanently affixing the image thereto.

* * * * *